United States Patent [19]

Gosney, Jr.

[11] 3,882,469

[45] May 6, 1975

[54] NON-VOLATILE VARIABLE THRESHOLD MEMORY CELL

[75] Inventor: William Milton Gosney, Jr., Richardson, Tex.

[73] Assignee: Texas Instruments Incorporated, Dallas, Tex.

[22] Filed: June 18, 1973

[21] Appl. No.: 370,583

Related U.S. Application Data

[62] Division of Ser. No. 203,387, Nov. 30, 1971.

[52] U.S. Cl.............. 340/173 R; 307/251; 307/304; 357/23; 357/41

[51] Int. Cl...... G11c 11/40; G11c 7/00; H01l 11/14

[58] Field of Search......... 340/173 R; 307/238, 304, 307/251, 279; 357/41, 23

[56] References Cited

UNITED STATES PATENTS 3,720,925 3/1973 Ross................................ 340/173 R 3,733,591 5/1973 Cricchi............................ 340/173 R

*Primary Examiner*—Stuart N. Hecker

*Attorney, Agent, or Firm*—Harold Levine; James T. Comfort; Gary C. Honeycutt

[57] ABSTRACT

Disclosed is a method which utilizes an insulated gate field-effect semiconductor device having a gate isolation comprised of at least two different gate isolation materials as a programmable non-volatile memory. Writing into the memory is accomplished by increasing the threshold voltage from its intrinsic device level to a second more positive level by trapping charges of one polarity in the gate isolation layers. Erasing the memory is accomplished by injecting into the gate isolation layers charges of opposite polarity, thereby neutralizing the previously stored charge and causing the modified device threshold voltage to return to substantially the intrinsic value.

5 Claims, 5 Drawing Figures

NON-VOLATILE VARIABLE THRESHOLD MEMORY CELL

Figure 1:
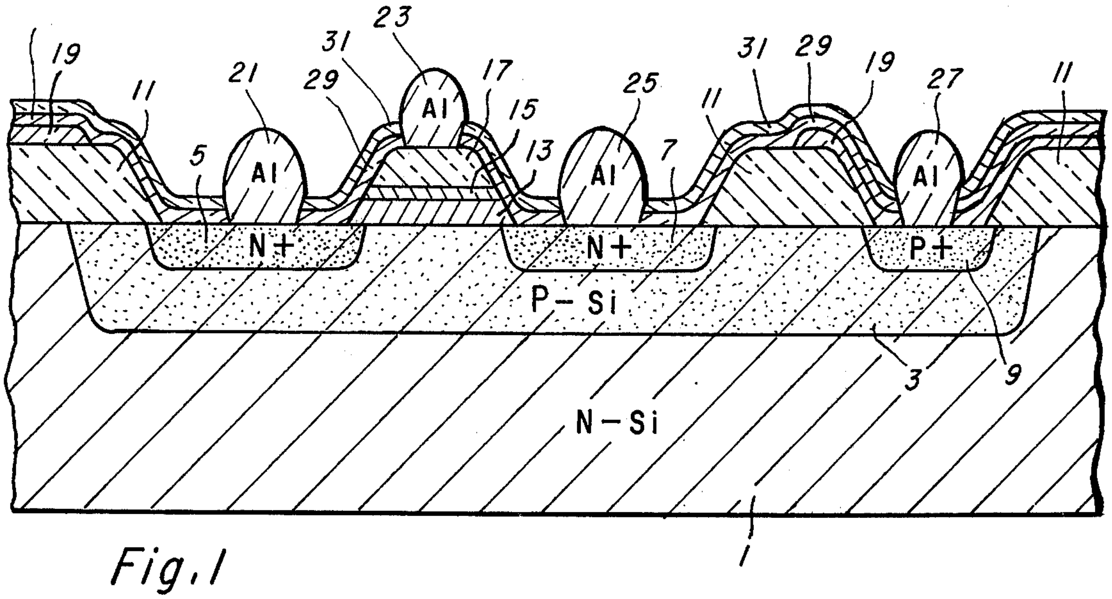

This is a division of application Ser. No. 203,387, filed Nov. 30, 1971.

This invention relates to methods for utilizing insulated gate field-effect devices as non-volatile memory cells in general and more specifically to methods utilizing a shift in threshold voltage levels in field-effect memory cells having at least two different gate isolation materials, one material conducting a charge of one polarity and trapping charges of opposite polarity and the second material conducting charges of opposite polarity and trapping charges of said one polarity.

With the arrival of the computer age, there has been a greater demand for physically smaller computers which function at higher speeds with greater memory and storage capacities. Semiconductor read-only-memories are presently utilized in programming the state of the art computer. One way to produce semiconductor read-only-memories (hereafter referred to as ROM) economically is to batch produce a memory matrix slice and then to subsequently program the matrix into the desired state. Technological developments have led to two distinct methods utilized in programming these arrays, one method utilizing mechanical techniques of selectively connecting desired devices by employing a specific set of process masks. Also, this method of programming may be effected by electrically open circuiting the metallization interconnects. The other method of programming memory arrays utilizes electrical programming by storing charge on specific transistors or transistor junctions and not storing charge on others. This method has led to attempts to create re-programmable memory arrays by discharging the previous pattern of charged and uncharged transistors and then selectively recharging a new array of "memory" transistors.

Methods utilizing metal-nitride-oxide-semiconductor (hereafter referred to as MNOS) field-effect transistors have been proposed wherein electrons are tunnel injected into the oxide-nitride interface under the gate terminal to control device threshold voltages, as described by Wallmark and Scott, "Switching and Storage Characteristics of MOS Memory Transistors," RCA Review 30, 335 (1969). Attempts have been made utilizing dual gate MOS transistors in which the inversion layer emits hot electrons into the gate area, as described by Dill and Toombs, "A New MNOS Charge Storage Effect," Solid-State Electronics 12, 981, (1969). Also attempts have been made to create programmable ROM's in MOS devices utilizing a floating gate structure which stores electrons which are injected into the gate region by avalanching a junction, as described by Frohmann-Bentchkowsky, "A Fully Decoded 2,048 Bit Electrically Programmable MOS ROM," IEEE ISSC, Session VII, page 7.3, 1971.

The tunnel injection of electrons into the oxide-nitride interface of an MNOS device requires a very thin (less than 50 angstroms) thermal oxide layer, which is difficult to control and to reproduce in a production environment. This tunnel injection approach further requires the disadvantage of applying both positive and negative voltages on the gate input protective circuit and addressing circuits. A dual gate MOS transistor structure has the disadvantage of requiring very large voltages for successful operation. The floating gate memory structure, although readily programmable, requires intricate and inconvenient means for electrical erasure.

Accordingly, it is an object of the present invention to produce a method for controlling the threshold voltage of field-effect transistor memory devices utilizing only voltages of one polarity. It is a further object of the present invention to produce a method for controlling the threshold voltage of a field-effect transistor memory device which utilizes relatively low voltages for successful operation. It is still a further object of the present invention to provide a means to electrically store and erase the stored charge on a field-effect transistor memory device, thereby providing reprogrammability.

Briefly, and in accordance with the present invention, writing into an insulated gate field-effect transistor (hereafter referred to as IGFET) memory cell is accomplished by a positive shift of the device threshold voltage by an incremental amount from the initial intrinsic value. As used in this application, the intrinsic threshold voltage level shall be the specific value resulting from the particular process used and the particular design and structure utilized, such as thickness of the oxide layers and concentrations of dopants. In n-channel IGFET devices having first and second gate isolation layers wherein one layer conducts charges of one polarity and traps charge of opposite polarity, and the other layer conducts charges of opposite polarity and traps charges of said one polarity, this threshold increase is accomplished by appropriately increasing positively the drain junction voltage to a point at which avalanche break-down occurs. Majority carries avalanche from the drain junction and flow to the source and substrate regions which previously had been electrically grounded. By simultaneously applying a small voltage of source polarity to the gate terminal, some of the avalanching carriers are drawn through the first gate oxide layer and are trapped at the interface of the gate isolation layers. To accomplish erasing of the memory cell, the device threshold voltage is returned to substantially the intrinsic value by increasing the voltage on the gate to a sufficient value which will initiate injection of opposite polarity charges from the gate electrode into the isolation layers. With the drain, source and substrate electrodes held at ground potential, injection will occur preferentially at the vicinity of the trapped charges. The injected charges of opposite polarity will thus be attracted to the trapped charges, neutralizing their charge and thus restoring the device threshold voltage to near its intrinsic value.

Figure 2:
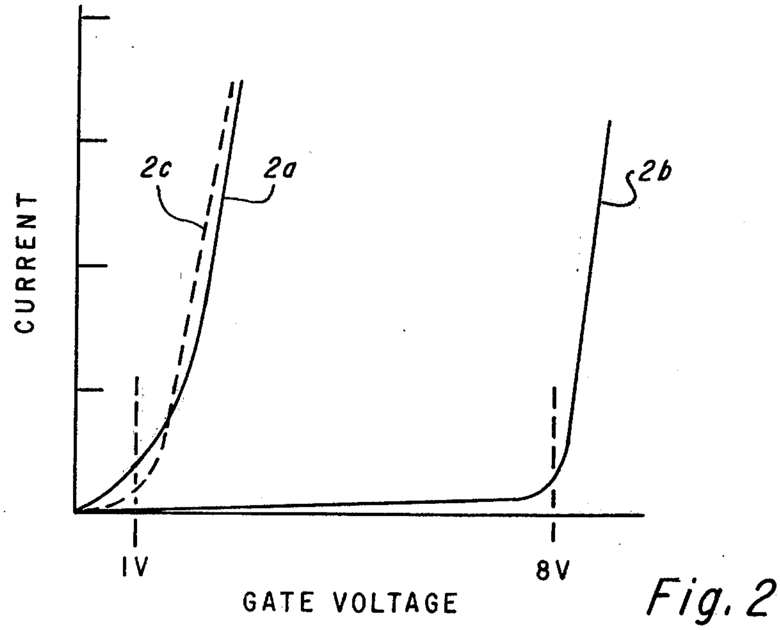
Figure 3:
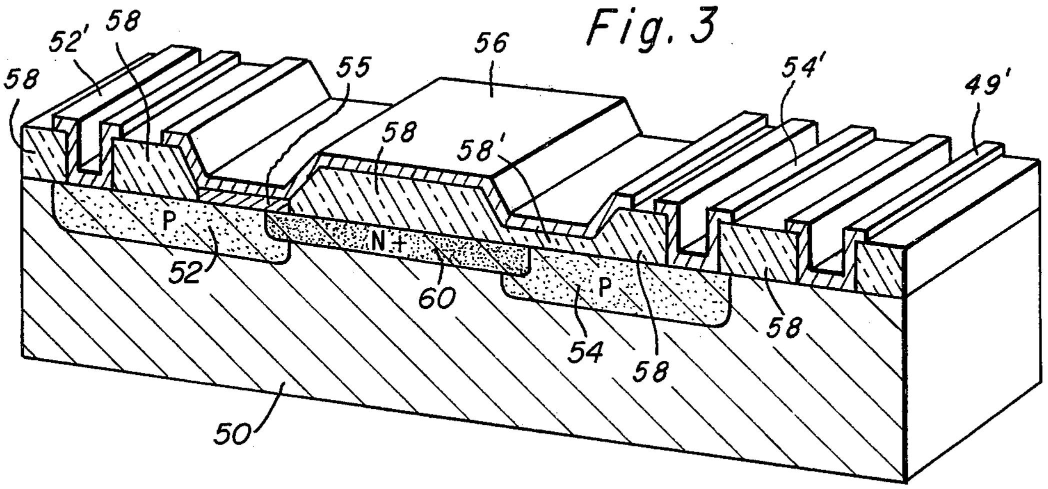
Figure 4:
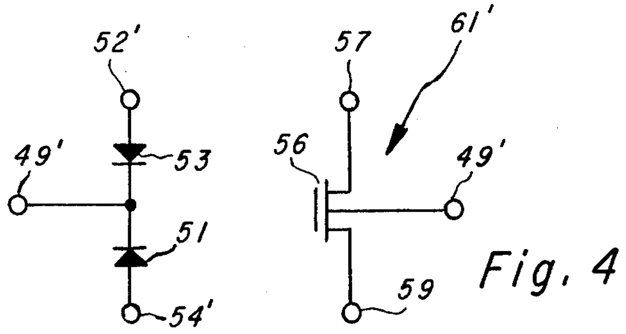
Figure 5:
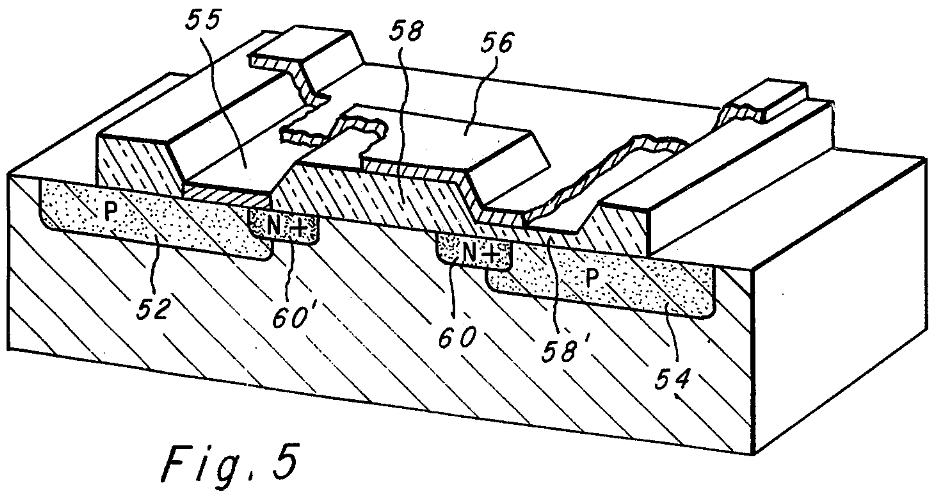

The novel features believed to be characteristic of this invention are set forth in the appended claims. The invention itself, however, as well as other objects and advantages thereof may be best understood by reference to the following detailed description when read in conjunction with the accompanying drawings wherein:

FIG. 1 depicts an n-channel MNOS non-volatile memory for application thereon of one embodiment of the present invention;

FIG. 2 exhibits the typical gate voltage-current (V-I) characteristics of the threshold voltage level for the MNOS device of FIG. 1, wherein 2*a* depicts the inherent threshold voltage, 2*b* depicts the incremented threshold voltage level after performing the writing step, and 2*c* depicts the threshold level substantially returning to its inherent value after the erase step;

FIG. 3 depicts a p-channel MNOS device utilized in a second embodiment of the invention with hole and electron injectors for floating gate control;

FIG. 4 schematically depicts the MOS device with the hole injector and electron injector of FIG. 3;

FIG. 5 depicts a two terminal embodiment wherein the MOS device of FIG. 4 is embodied in the hole and electron injectors of FIG. 3.

With reference now to FIG. 1, there is depicted an *n*-channel MNOS device to which one embodiment of the invention is applied. An *n*-type monocrystalline silicon substrate 1 having a surface in the (100) orientation and approximately 4 to 6 ohm-centimeter conductivity is utilized as starting material. After growing a thermal oxide masking layer over its surface, the oxide is selectively removed over portions of the substrate in which transistors are to be fabricated. Thereafter, a boron-doped silane oxide film is deposited over the entire slice. The boron is then diffused into the transistor sites to provide the *p*-type silicon pocket 3 in which the *n*-channel transistor will be fabricated. During the boron diffusing step, a thick (10,000 to 15,000 A) thermal oxide layer 11 is grown over the entire slice. After removing this oxide 11 above the p-type pocket 3 where the gate, source, drain, and isolation contacts are desired, the gate oxide 13 is grown to an approximate thickness of 800 A. Then the gate silicon-nitride layer 15 and the gate conductor 23 are deposited over the slice. By way of example, the silicon nitride may be formed to a thickness of about 500 A. Silicon nitride is utilized as it prevents conduction of electrons, yet allows hole conduction. Other materials exhibiting this characteristic may be suitable. Portions of isolation layers 13 and 15 are removed from above the active and contact regions except in the region of the channel and the thick oxide 11. Following a boron doped silane layer 19 deposition over the entire slice and subsequent removal of this layer 19 except in the isolation contact area, a phosphorous doped silane oxide layer 29 is deposited over the slice. After an undoped layer of silane oxide 31 is deposited, a subsequent diffusion causes the respective dopants to form the *n*+ source 7 and drain 5 and the *p*+ isolation contact region 9. After contact oxide removals (OR's) are cut, the metal contacts are evaporated. For this embodiment, the gate conductor is molybdenum (which may be grown to an approximate thickness of 3,000 A) although polycrystalline silicon or any gate metal which exhibits a lowering of the Schottky barrier upon the application of an electric field, thus allowing hole injection, could be utilized. For a more complete and detailed description of the above described MNOS process, reference is made to copending patent "COMPLEMENTARY INSULATED GATE FIELD-EFFECT DEVICES" by Bernard G. Carbajal, III et al, U.S. Pat. No. 3,673,679 issued July 4, 1972, filed Dec. 1, 1970.

To achieve memory operation in the *n*-channel MNOS device of FIG. 1, the threshold voltage is first increased to a value several volts more positive than the initial intrinsic value. This is accomplished by increasing the drain voltage to a point at which avalanche breakdown occurs. The concentration of the isolation pocket 3 is in the region 3–5 × $10^6$ atoms/cc to insure a positive initial threshold voltage. This concentration will cause the source and drain diffusion to avalanche when they are reverse biased to about 20–30 volts. After a small positive voltage is applied to the gate contact 23, hot electrons which are injected from the avalanching junction 6 are drawn through the silicon oxide layer 13 and are trapped at the nitride-oxide interface. This additional negative charge applied between the isolated gate contact 23 and the channel effectively increases the threshold voltage of the channel region near region 6 to approximately 10 volts, depending upon the relative nitride-oxide thicknesses, and the value of the avalanche voltage. The overall effect of increasing the threshold of a narrow region in the channel is essentially that of increasing the effective threshold voltage of the entire channel to about the same value. Thus, the threshold voltage level is either increased to a greater positive level or is left uneffected at its intrinsic state during the write operation, according into which state the cell is desired to be set.

To erase information written into the memory cell, as herein described above, the substrate, source and drain contacts are electrically grounded, and a relatively large positive voltage of approximately 40 or 50 volts is applied to the gate contacts. This high gate potential results in a high electric field in the vicinity of the trapped charges and causes a lowering of the Schottky barrier between the molybdenum gate contact and underlying nitride layer. Consequently, there is a resulting injection of holes from the gate contact into the nitride. The holes are attracted to the trapped negative charge, and the resulting recombination of the holes and the trapped electrons restores the device threshold voltage level to near its inherent value.

In FIG. 2, graph 2*a* shows the approximate intrinsic value of the threshold voltage level before the write operation. Graph 2*b* shows the resulting increased threshold voltage level of approximately 10 volts after the write operation. The applied gate and drain voltages are approximately 20 volts and are maintained for some 5 seconds. Graph 2*c* shows the threshold voltage characteristic after the erase operation, wherein the voltage level returns to approximately 1 volt. To accomplish this erasing step the gate voltage is increased to 50 volts terminal. Thus, as seen from Graphs 2*a* and 2*c*, the information stored in the memory cell has essentially been erased, and the cell is adaptive to receive a new write instruction.

A second embodiment of the invention is illustrated in FIGS. 3 and 4. An *n*-type substrate 50 has pockets 52 and 54 of *p*-type conductivity material deposited within its surface. Diffused into pockets 52 and 54 is a thin layer 60 of highly concentrated *n*-type material (*n*+) shown here to be continuously interconnecting said pockets. This layer, however, need not be continuous between said pockets, as its utility is to lessen the breakdown voltage of that particular p-n junction. A layer of thick oxide 58 is grown overlying said substrate, pockets and layers. Overlying portions of both pocket 54 and layer 60 is a region of thin oxide 58' which is, for convenience, shown to be the same oxide as thick oxide 58. Overlying portions of pocket 52 and layer 60 is a body of nitride 55, of thickness approximate to that of said thin oxide. Contiguous with and overlying regions of the oxide 58, nitride body 55 and thin oxide 58' is the gate layer 56, hereafter referred to as the buried gate. This buried gate 56 is later enclosed within an oxide such that said gate is completely electrically isolated. Metallization contacts 52' and 54' make electrical connections to pockets 52 and 54, respectively. Contact 49' electrically connects to the substrate 50 and is normally grounded.

Operation of the embodiment in FIG. 3 may best be understood when viewed with FIG. 4. FIG. 4 shows contacts 52' and 54' as anode terminals of the hole injector diode 53 and electron injector diode 51, respectively. The buried gate 56 is shown as the gate terminal 56 on the field-effect device. Diodes 51 and 53 represent an electron injector and a hole injector respectively which are illustrated in FIG. 3.

Field-effect device 61 may be a conventional MOS "buried gate" device, with the modification of the buried gate 56. Buried gate 56 is the buried gate of the injector diodes 51 and 53; that is, the buried gate of the MOS device 61 is extended to overlie pockets 52 and 54 of the diodes. This device may be constructed by the process described in the Carbajal Application, supra.

Operation is as follows. Under normal operating conditions the channel formed between source 57 and drain 59 of FIG. 4 is of *n*-conductivity type and non-inverted. However, if a sufficiently large negative voltage is applied to contact 54' of the electron injector diode 51 and circuit ground is applied to substrate contact 49', electron and hole avalanching will occur. Some of the avalanched electrons will travel through the thin oxide of the diode region (which as previously explained conducts electrons and traps holes) and will be attracted to the overlying conductive buried gate 56. Because the buried gate 56 is electrically isolated, this charge on the gate segment overlying region 58' will redistribute over the surface and reach an equal potential state. Polycrystalline silicon is a suitable purpose for this buried gate 56, however other suitable materials may be utilized. When a sufficiently large charge is reached on gate 56, the charge will cause the channel region to invert (a positive shift in $V_{TX}$) and allow conduction between the drain and source of device 61, i.e., one logic state of the memory.

The device will remain in this logic state indefinitely since te buried gate 56 is electrically isolated, and accordingly there is substantially zero leakage from the gate. Thus, after the device has been set in this logic state, it essentially will retain that one state until reprogrammed.

To reprogram the memory cell, a high negative voltage is applied to the anode of the hole injector diode 53' with regions 50 and 60 electrically grounded. Now, however, upon reaching avalanche voltage, holes (which as well as electrons are freed during the avalanche phenomenon) are conducted through the hole injector diode nitride layer (which traps electrons and thus prevents their reaching the buried gate 56). The holes reach the gate 56 and neutralize the negative charge previously therestored. Upon sufficient application of negative voltage in this manner, the entire preexistant negative charge on the gate may be neutralized, which allows the channel of device 61 region to reinvert to its normal *n*-conductivity type state and thus cause the device to become non-conducting. Now the device has been reprogrammed to the other logic state, and is ready to be programmed again.

A modification of this emobodiment results when, instead of utilizing the four terminal device discussed above, the drain terminal 59 is avalanched to supply the electrons instead of avalanching the electron injector diode 51. Thereafter hole injector 53 is avalanched to return the threshold of the device 61 to the less positive value.

FIG. 5 depicts a cross section view of a two terminal embodiment which results when the diode injectors of FIG. 3 are utilized also as the MOS device 61 in FIG. 4. In this embodiment, the *n*+ layer 60' must not extend across the entire width of the channel. Referring to FIG. 5, regions 60' may extend across the channel as far as does thick oxide region 58. As noted earlier, 60' may extend the length of the channel but need not, as illustrated. Terminals 57 and 59 of FIG. 4 are accordingly 52' and 54' in this two terminal embodiment. Terminals 52', 54' and 49' have not been shown in FIG. 5, as a matter of convenience. Operation of this device is as follows:

Upon electrically grounding source terminal 52' and substrate terminal 49' and applying a large negative voltage to drain terminal 54' until avalanching occurs, "hot" electrons will traverse through the thin oxide and distribute a negative charge upon the buried gate 56. This charge on gate 56 induces an inversion region in the channel separating the pockets 52 and 54 adjacent layer 60' to cause the device to become conducting between pockets 52 and 54, i.e., one logic state. Thereafter applying electrical ground to region 54 and supplying a high negative voltage to region 52 until avalanching occurs, will cause a quantity of holes to traverse the nitride region 55 to neutralize the negative charge on gate 56. With substantially zero charge or a positive charge on the buried gate 56, the channel reinverts to cause the device to become non-conductive, i.e., the other logic state.

It is to be understood that both *p*-channel and n-channel IGFETS may be used in accordance with the invention. Furthermore, it also is to be understood that the invention is not limited to the use of silicon oxide and silicon nitride as the gate isolation material; other suitable materials may be advantageously utilized.

Although specific embodiments of this invention have been described herein in conjunction with a specific memory cell embodiment, various modifications to the details of operation will be apparent to those skilled in the art without departing from the scope of the invention.

What is claimed is:

1. In the operation of a non-volatile memory cell comprising an insulated gate field-effect semiconductor device having a source and drain and having a gate isolation means including two gate isolation materials, one of which is characterized by the ability to preferentially trap charges of one polarity, the other being characterized by the ability to preferentially trap charges of the opposite polarity, the improved method comprising the steps of:

a. writing into the memory cell by increasing the positive voltage on the drain junction to a level which causes avalanche breakdown, while simultaneously applying a small voltage of source polarity to the gate terminal, thereby driving some of the avalanching carriers through only one of said gate isolation materials whereby a trapped charge is stored at the interface between the two gate isolation materials; then at an appropriate later time b. erasing the memory cell by increasing the voltage on the gate to a sufficiently high level to initiate injection of charges of opposite polarity from the gate electrode into the isolation layers, while holding the source, drain and substrate electrodes at substantially ground potential, thereby causing said injection to occur preferentially at the interface between the gate isolation layers, whereby the stored charge at that location is neutralized to restore the threshold voltage to substantially its intrinsic value.

2. A method as in claim 1 wherein said insulated gate field-effect device is an *n*-channel MNOS IGFET.

3. The method of claim 1 wherein said trapped charges are electrons and said neutralizing charges are holes, said holes being injected into the gate region by Schottky injection from the gate contact.

4. A method as in claim 1 wherein said gate isolation means consists essentially of a silicon oxide layer adjacent the semiconductor, covered by a silicon nitride layer, said oxide layer having a thickness substantially greater than any thickness that would permit electron tunneling.

5. A method as in claim 4 wherein the thickness of said oxide is about 800 Angstroms.

* * * * *